United States Patent
Spaulding et al.

(10) Patent No.: US 7,289,663 B2
(45) Date of Patent: Oct. 30, 2007

(54) PRODUCING AN EXTENDED COLOR GAMUT LUMINANCE-CHROMINANCE DIGITAL IMAGE FROM A CAPTURED IMAGE

(75) Inventors: Kevin E. Spaulding, Spencerport, NY (US); Kenneth A. Parulski, Rochester, NY (US); Wayne E. Prentice, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 1013 days.

(21) Appl. No.: 10/202,313

(22) Filed: Jul. 24, 2002

(65) Prior Publication Data

US 2004/0190770 A1    Sep. 30, 2004

(51) Int. Cl.
*G06K 9/36* (2006.01)

(52) U.S. Cl. .................. 382/167; 358/518; 358/520; 345/427; 345/590; 345/591; 345/603; 345/604; 348/223.1; 348/254; 348/255; 348/256; 348/450

(58) Field of Classification Search ................ 358/518, 358/520; 345/427, 590, 591, 603, 604; 382/167; 348/223.1, 254–256, 450
See application file for complete search history.

(56) References Cited

U.S. PATENT DOCUMENTS

| | | | |
|---|---|---|---|
| 5,164,831 A | 11/1992 | Kuchta et al. | |
| 5,565,931 A * | 10/1996 | Girod | ................. 348/675 |
| 5,659,357 A | 8/1997 | Miyano | |
| 5,668,596 A | 9/1997 | Vogel | |
| 5,760,917 A | 6/1998 | Sheridan | |
| 5,805,213 A | 9/1998 | Spaulding et al. | |
| 6,147,772 A * | 11/2000 | Pritchett | ................. 358/1.9 |
| 6,278,800 B1 | 8/2001 | Madden et al. | |
| 6,393,148 B1 * | 5/2002 | Bhaskar | ................. 382/169 |
| 6,758,574 B1 * | 7/2004 | Roberts | ................. 362/162 |
| 7,184,057 B2 * | 2/2007 | Stokes et al. | ................. 345/600 |
| 2002/0044293 A1 * | 4/2002 | Fukasawa | ................. 358/1.9 |
| 2003/0072015 A1 * | 4/2003 | Fujino | ................. 358/1.9 |

OTHER PUBLICATIONS

PC Card Standard Release 2.0 published by the Personal Computer Memory Card International Association, Sunnyvale, California, Sep. 1991.
"Optimized Extended Gamut Color Encoding for Scene-Referred and Output-Referred Image States", by Kevin Spaulding et al., Journal of Imaging Science and Technology, vol. 45, No. 5, Sep./Oct. 2001.
CompactFlash Specification Version 1.3, published by the CompactFlash Association, Palo Alto, California, Aug. 15, 998.

* cited by examiner

*Primary Examiner*—Aung S. Moe
*Assistant Examiner*—Jacob P. Rohwer
(74) *Attorney, Agent, or Firm*—Raymond L. Owens

(57) ABSTRACT

A method for producing an extended color gamut luminance-chrominance digital image from a captured digital image includes determining an estimate of the colors of the captured digital image of an original scene and further processing to produce an extended range output RGB image value including values outside the range that can be displayed on the output image display device, and producing an extended color gamut luminance-chrominance digital image by transforming the extended range output RGB image values to a luminance-chrominance representation.

28 Claims, 11 Drawing Sheets

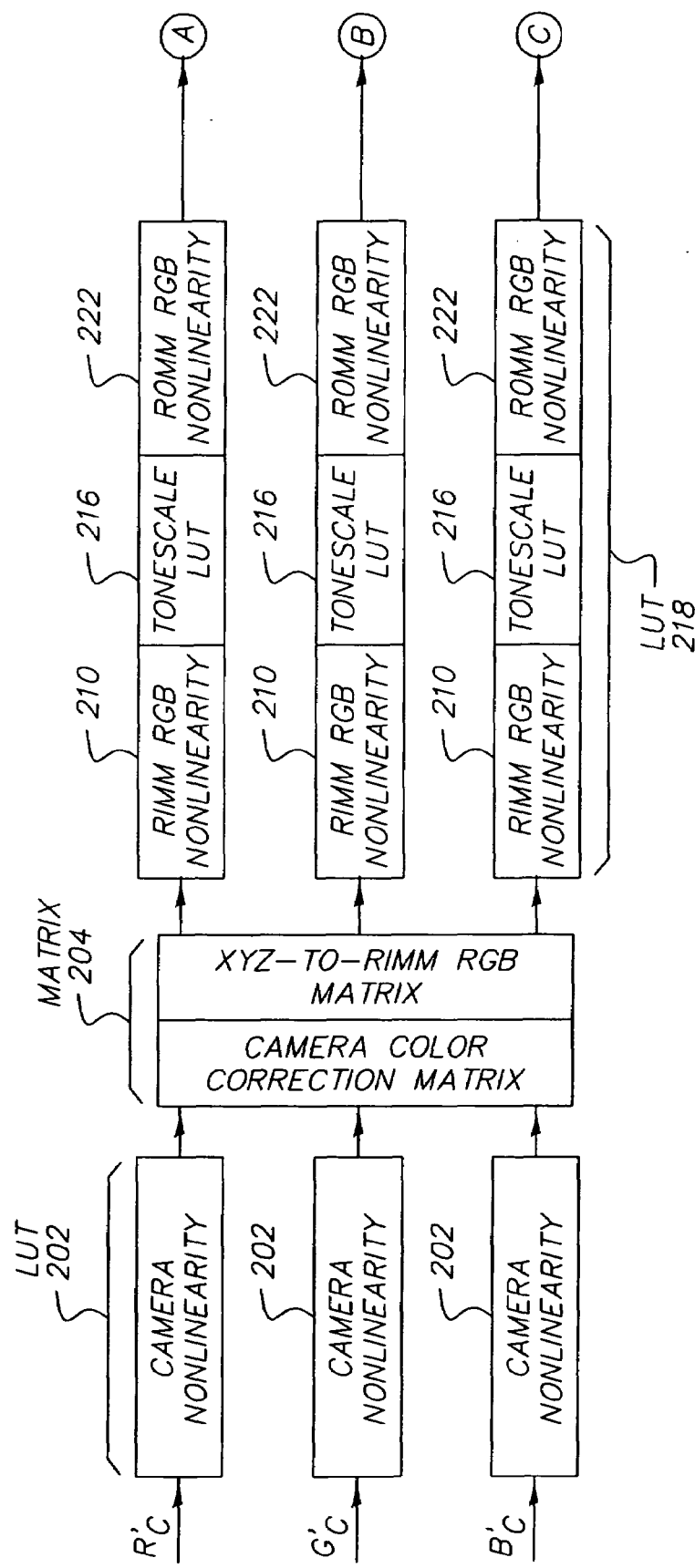
FIG. 4E1

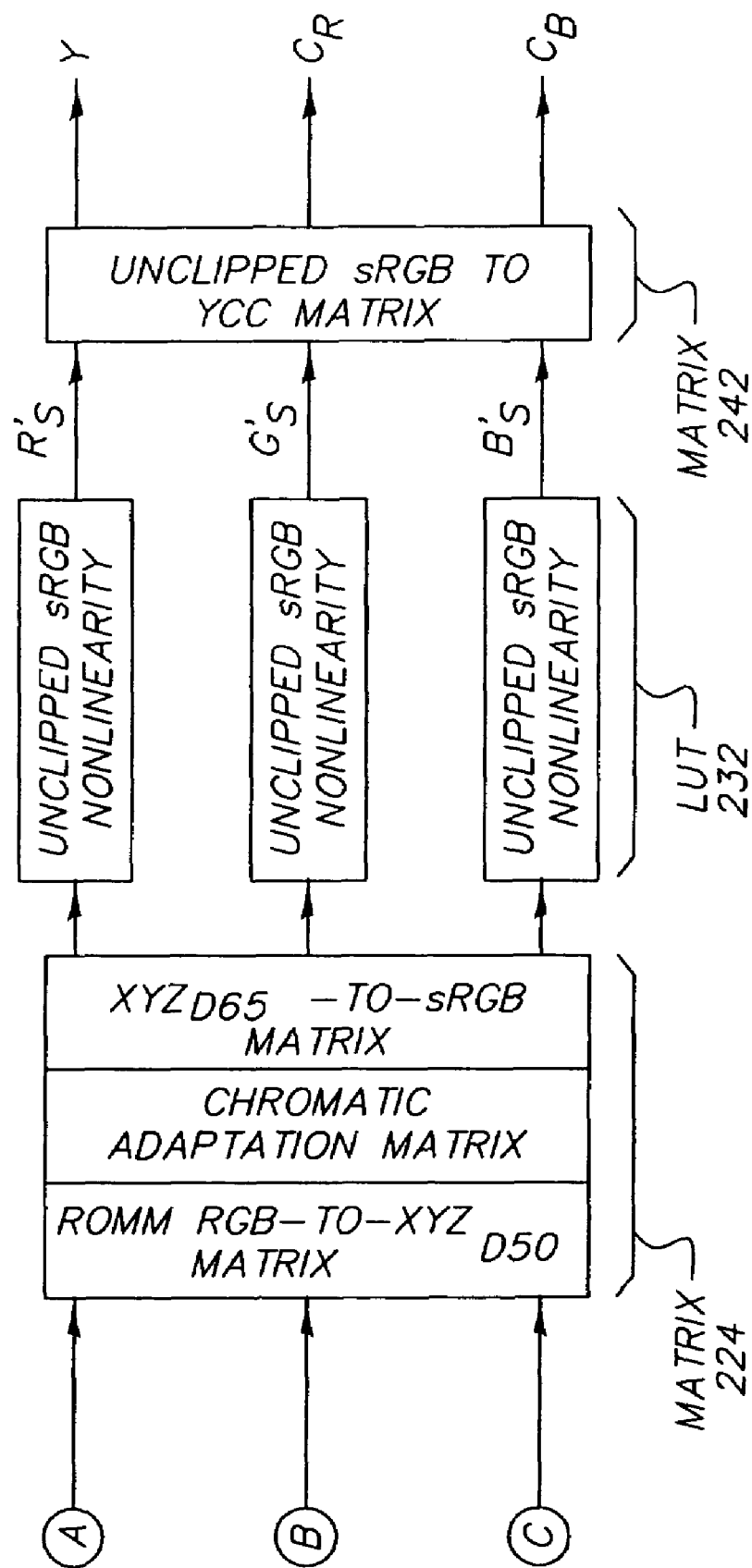
FIG. 4E2

PRODUCING AN EXTENDED COLOR GAMUT LUMINANCE-CHROMINANCE DIGITAL IMAGE FROM A CAPTURED IMAGE

FIELD OF THE INVENTION

The present invention relates to encoding color digital images, and more particularly to producing an extended color gamut luminance-chrominance encoding of a captured digital image.

BACKGROUND OF THE INVENTION

Color digital cameras are used by a growing number of consumers and professional photographers. These cameras use one or more CCD or CMOS image sensors to determine an estimate of the colors of an original scene, and digitally process these captured color records to produce a color image file.

In order to provide interoperability between cameras and other digital devices, such as a computer, appliance printer, or photo kiosk, a standard image data format must be used. This ensures that the digital device can properly interpret the digital image data provided by the digital camera. Many digital cameras use JPEG image compression, which converts RGB color images into a luminance (Y) and two chrominance (R-Y, B-Y) signals. Next, a discrete cosine transform (DCT) is performed on 8×8 pixel blocks of Y and subsampled R-Y and B-Y signals. The DCT coefficient values are then quantized and entropy coded.

Most current consumer digital cameras produce JPEG images using the Exif version 2.1 image format. The Exif files are named and organized into folders using the DCF version 1.0 standard. DCF requires that the color image be interpreted as sRGB image data in order to ensure interoperability. The sRGB image data is "rendered" color data that can be immediately used by most software applications. The sRGB color data is represented using 24 bits per color, with each of R, G, and B encoded using an 8-bit value from 0 to 255. To produce sRGB color data, the captured camera RGB image signals are transformed, typically using a 3×3 color matrix, to output colors represented using the sRGB color primaries. By limiting the sRGB colors to values between 0 and 255, the gamut of colors that can be encoded in the image file is reduced and limited to those that can be displayed on a typical CRT.

Many digital cameras today are capable of capturing color data that has a wider dynamic range and larger color gamut than sRGB provides. Because the digital images are JPEG compressed using Y, R-Y and B-Y (YCC) component signals, it is possible to encode colors that are outside the sRGB gamut using the Exif image format. Several digital photography formats, including the Kodak Photo CD "PhotoYCC" format, the Epson Print Image Matching (PIM) image format, and the JCIA Exif version 2.2 image format (Exif Print) have recognized that YCC component signals are able to encode some colors having RGB values which are outside the range of 0 to 255, and thus provide an extended color gamut. To produce this extended color gamut, the digital camera must process the captured colors in a way that provides "unclipped" sRGB values which can be converted into the YCC component signals in a way that maintains the extended color gamut.

Unfortunately, the color image processing in current digital cameras does not provide an accurate encoding for colors in the extended color gamut range. Some digital cameras use a single color matrix to convert from gamma corrected scene color values to YCC component values. While this processing produces color values in the extended color gamut range, the resulting color values are not accurate representations of the original scene colors. Other digital cameras use a single color matrix to convert from linear scene color values to linear RGB values represented in terms of the sRGB primaries, followed by gamma correction and a second matrix, which converts from sRGB to YCC values. Since the sRGB signals are clipped to values between 0 and 255 during this processing, the extended color gamut range of the YCC signal is not utilized.

What is needed is a method for producing an extended gamut luminance-chrominance digital image from a captured image that accurately represents the original scene colors corresponding to the extended color gamut range of the YCC signal in a JPEG image file.

SUMMARY OF THE INVENTION

It is an object of the present invention to provide a way for a digital camera to effectively provide an extended color gamut digital image from a captured digital image.

In accordance with one aspect of the present invention there is provided a method for producing an extended color gamut luminance-chrominance digital image from a captured digital image comprising the steps of:

a) determining an estimate of the colors of the captured digital image of an original scene;

b) determining intermediate scene RGB image values for the captured digital image by representing the scene colors in terms of a first set of RGB primaries;

c) determining intermediate rendered RGB image values by applying a rendering transformation to the intermediate scene RGB image values, wherein the rendered RGB image values are a representation of the colors of a rendered image in terms of the first set of RGB primaries;

d) determining extended range output RGB image values from the intermediate rendered RGB image values by transforming from the first set of RGB primaries to a second set of RGB primaries associated with an output image display device to produce extended range output RGB image values, wherein the extended range output RGB image values include values outside the range that can be displayed on the output image display device; and e) producing an extended color gamut luminance-chrominance digital image by transforming the extended range output RGB image values to a luminance-chrominance representation.

It is an advantage of the present invention that an extended gamut luminance-chrominance digital image can be produced from a captured image.

It is a further advantage of the present invention that the extended gamut luminance-chrominance digital image produced from the captured image accurately portrays the original scene colors corresponding to the extended color gamut range of the YCC signal in a JPEG image file.

BRIEF DESCRIPTION OF THE DRAWINGS

In the detailed description of the preferred embodiments of the invention presented below, reference is made to the accompanying drawings.

DETAILED DESCRIPTION OF THE INVENTION

The present invention is directed to a method for producing an extended gamut luminance-chrominance digital image from a captured image, which accurately represents the original scene colors. The method can be implemented by a digital camera in order to produce an image file using YCC components to store an extended gamut color image.

Figure 6:
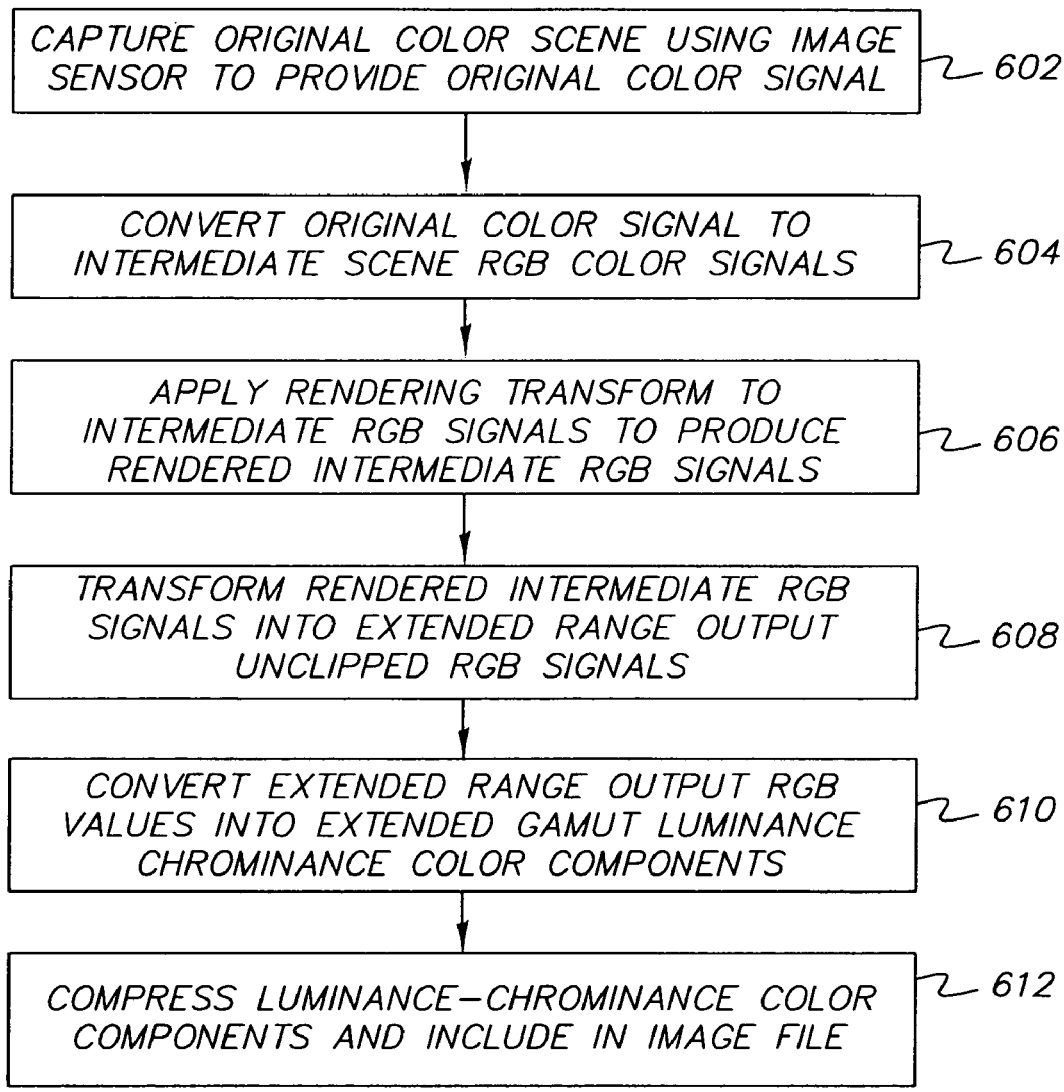
FIG. 6 depicts a method for implementing the present invention.

In one preferred embodiment depicted in FIG. 6, the digital camera includes a color image sensor for capturing the image of an original color scene and providing an original color signal (block 602). An image processor in the camera converts the original color signal to intermediate scene RGB color signals (block 604) in terms of the RIMM RGB primaries using a 3×3 color matrix, and then uses three one-channel look-up tables to apply a rendering transformation to these intermediate RGB color signals to produce rendered intermediate RGB color signals (block 606). The processor uses a 3×3 color matrix to transform the rendered intermediate RGB color signals into extended range output RGB color signals represented in terms of the sRGB primaries, but having "unclipped" RGB values (block 608). The processor then uses a 3×3 matrix to convert the extended range output RGB values into extended color gamut luminance-chrominance YCC color components (block 610). These YCC color components are then JPEG compressed and included within an Exif version 2.2 image file (block 612), which is stored by the digital camera on a removable memory card.

Figure 1:
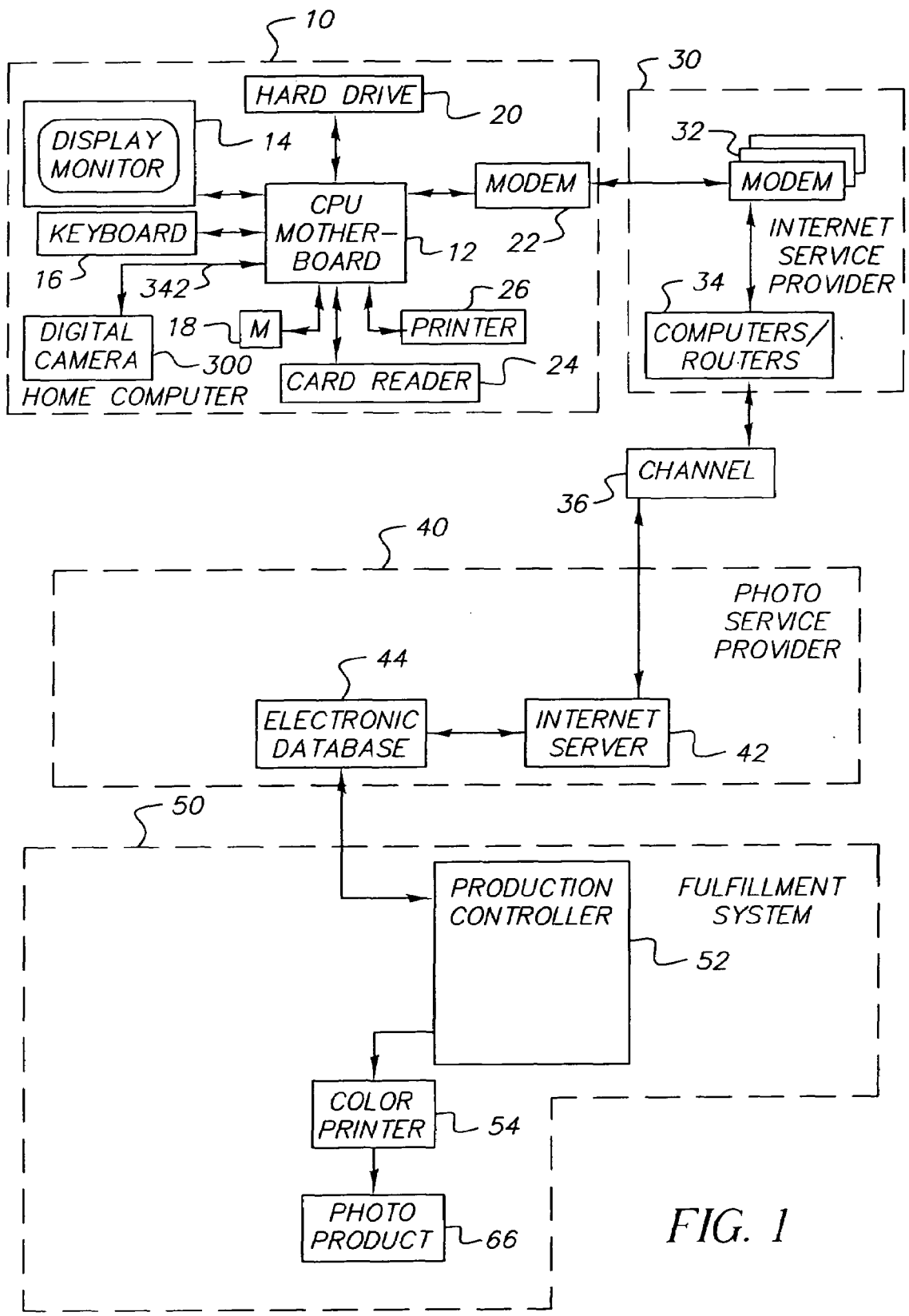
FIG. 1 illustrates in block form a digital imaging system made in accordance with the present invention.

FIG. 1 depicts a block diagram of a system that implements the present invention. As shown in FIG. 1, the system includes a digital camera 300 that captures images and produces color digital image files, as will be described later in reference to FIG. 2. The digital camera 300 is one example of an imaging device that can be used in a system made in accordance with the present invention. Other examples of imaging devices include film scanners and print scanners.

The system of FIG. 1 also includes a home computer system 10. The home computer 10 includes a CPU motherboard 12, having for example, an Intel Pentium IV processor as well as RAM memory. The CPU motherboard 12 executes software stored on a hard drive 20, for example, the well known Windows XP operating system software. The hard drive 20 is also used to store the application software that can be used to facilitate viewing and printing of images captured using the digital camera 300.

The CPU motherboard 12 is coupled to a display monitor 14 and a keyboard 16. A mouse 18 permits the user to readily communicate with the CPU motherboard 12. The home computer 10 also includes a dial-up modem 22 for communicating with the Internet Service Provider (ISP) 30 in order to connect to a channel 36, such as the Internet, in order to transfer images to another location for storage and printing. The CPU motherboard 12 can communicate directly with the digital camera 300 over a suitable wired or wireless interface 342, such as the well known Universal Serial Bus (USB) interface. The CPU motherboard 12 also communicates with a card reader 24, which can read and write data on a removable memory card 330 (shown in FIG. 2) used in the digital camera 300. The home computer 10 also includes a printer 26, which communicates with the CPU motherboard 12 over a suitable interface, such as the well known Universal Serial Bus (USB) interface.

In alternative embodiments, other devices, such as a television set-top box or Internet appliance, could be used in place of the home computer 10. Also, the connection between the digital camera 300 and the home computer 10 could utilize a camera dock, such as the Kodak EasyShare camera dock.

The ISP 30 includes banks of modems 32, one of which is connected to communicate with the modem 22 of the home computer 10. The modem 32 in turn communicates with computers/routers 34 in order to provide a connection to the channel 36, which is preferably the Internet, using equipment and techniques well known to those skilled in the art. A photo service provider 40 communicates with a fulfillment system 50, which is comprised of one or more computers and associated peripherals for producing photo products, such as hardcopy prints, album pages, photo mugs, PictureCD discs, and the like. The fulfillment system 50 includes a production controller 52 connected to one or more color printers 54, which can produce photo products 66 such as album pages or standard hardcopy prints.

The electronic database 44 includes information describing each customer account, including user billing information. The billing information can include a payment identifier for the user, such as a charge card number, expiration date, and user billing address. The electronic database 44 can optionally provide long-term storage of the uploaded images for each user. In this case, stored images are accessible (e.g. viewable) via the Internet by authorized users, as described, for example, in commonly assigned U.S. Pat. No. 5,760,917 to Sheridan, the disclosure of which is herein incorporated by reference. The electronic database 44 can be provided by the same computer as the network server 42, or can utilize a separate computer, or can be distributed over several computers at the same physical site, or at different sites.

Figure 2:
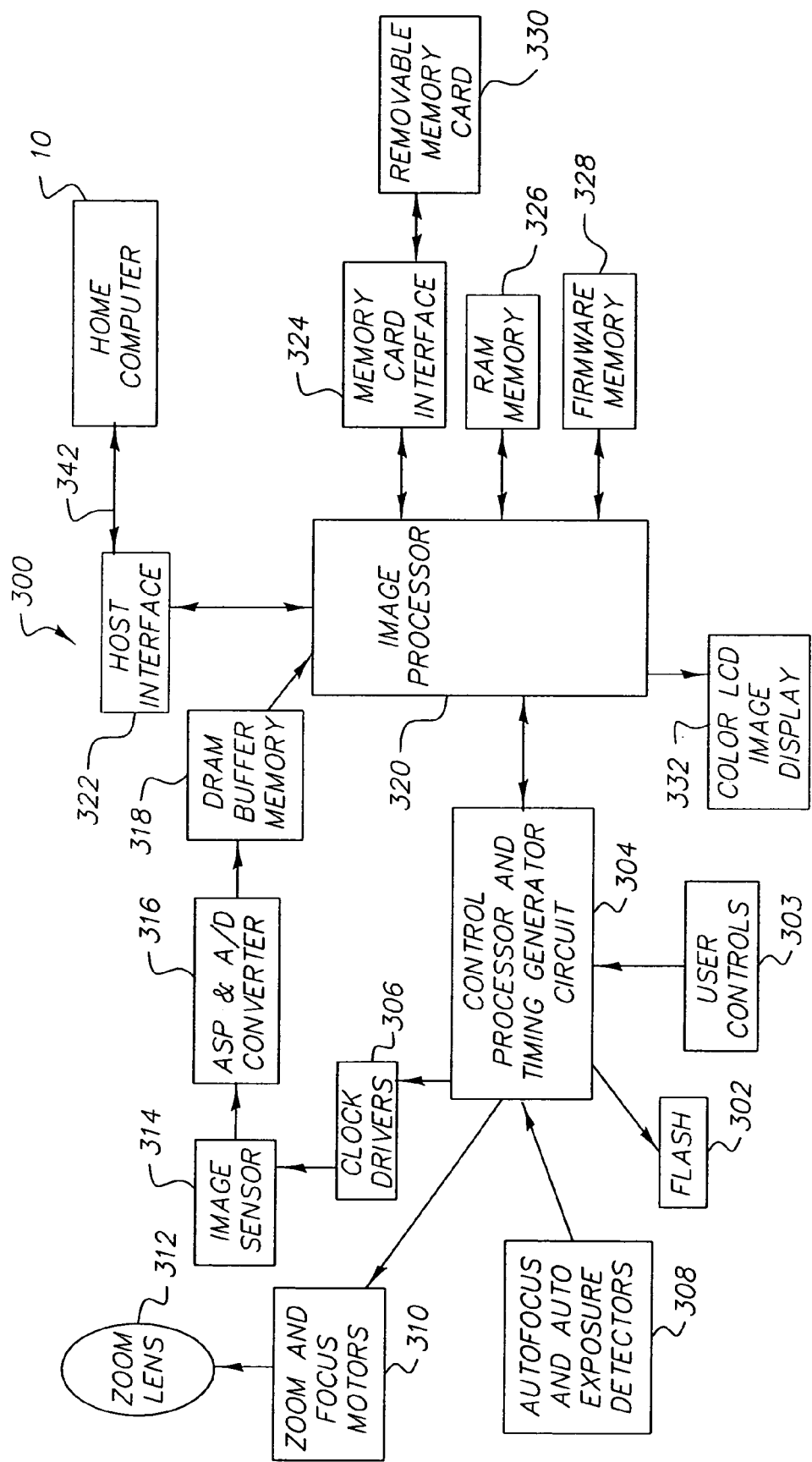
FIG. 2 illustrates in block form the digital camera depicted in FIG. 1.

The digital camera is shown in block diagram form in FIG. 2. The digital camera 300 produces digital images that are stored on the removable memory card 330. The digital camera 300 includes a zoom lens 312 having zoom and focus motor drives 310 and an adjustable aperture and shutter (not shown). The user composes the image using the optical viewfinder (not shown) and the zoom lens control (not shown), and then depresses the shutter button (not shown) to begin capture of a still image. The zoom lens 312 focuses light from a scene (not shown) on an image sensor 314, for example, a single-chip color CCD or CMOS image sensor, using the well known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator 304 receives inputs from autofocus and auto-exposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which can be flash EPROM memory. Alternatively, the processor 320 can be provided by custom circuitry (e.g. by one or more custom integrated circuits (ICs) designed specifically for use in digital cameras), or by a combination of programmable processor(s) and custom circuits.

The processed digital image file is provided to a memory card interface 324, which stores the digital image file on the removable memory card 330. Removable memory cards 330 are one type of removable digital storage medium, and are available in several different physical formats. For example, the removable memory card 330 can include memory cards adapted to the PCMCIA card interface standard, as described in the *PC Card Standard, Release* 2.0, published by the Personal Computer Memory Card International Association, Sunnyvale, Calif., September 1991. The removable memory card 330 can alternatively be adapted to the Compact Flash interface standard, such as described in the *CompactFlash Specification Version* 1.3, published by the CompactFlash Association, Palo Alto, Calif., Aug. 5, 1998, or to the well known SmartMedia, MemoryStick, or SD memory card formats. Other types of removable image digital storage media, such as magnetic hard drives, magnetic tape, or optical disks, can alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 330. The JPEG file uses the so-called "Exif" image format defined in "*Digital Still Camera Image File Format* (Exif)" version 2.1, July, 1998 by the Japan Electronics Industries Development Association (JEIDA), Tokyo, Japan. This format includes an Exif application segment that stores particular image metadata, for example the date and time the picture was captured, the lens f/number and other camera settings.

The processor 320 also creates a low-resolution "thumbnail" size image, which can be created as described in commonly-assigned U.S. Pat. No. 5,164,831 to Kuchta et al., the disclosure of which is herein incorporated by reference. In a preferred embodiment, this thumbnail image has 160×120 pixels, to conform to the DCF rules described later, and is stored in RAM memory 326 and supplied to the color LCD image display 332.

The Exif image files, containing the JPEG compressed main image, thumbnail image, and the image metadata, are stored on the removable memory card 330 using a directory structure conforming to the so-called "DCF" rules defined in "*Design Rule For Camera File System*" version 1.0, December 1998 by the Japan Electronics Industries Development Association (JEIDA), Tokyo, Japan.

The graphical user interface displayed on the color LCD image display 332 is controlled by user controls 303, which may include push buttons, mode dials, joysticks, touch screens, or the like. The digital camera 300 can also include a video output driver and connector (not shown) for displaying the captured images and the graphical user interface on a TV (not shown). In a preferred embodiment, the digital camera 300 includes a mode control (not shown) which provides a "capture" mode and a "review/order" mode. When set in the capture mode, the digital camera captures digital images and stores corresponding image files on the removable memory card 330. When set in the review/order mode, the camera displays thumbnail images from the image files stored on the removable memory card 330, and provides a graphical user interface which enables the user to select images for printing and emailing. In the review/order mode, the user can decide which images to print, and how many copies to make. The user can also decide which images to email to one or more recipients.

As shown in FIG. 1 and FIG. 2, an interface cable 342 can be used to connect between the host interface 322 in the electronic camera 300 and a corresponding camera interface (not shown) in the home computer 10. The interface cable 342 may conform to, for example, the well known Universal Serial Bus (USB) interface specification. The interface cable 342 can be used to download images from removable memory card 330 to home computer 10, instead of using card reader 24 (FIG. 1). The interface cable 342 can also be used to transfer data from home computer 10 to firmware memory 328 in camera 300.

Figure 3:
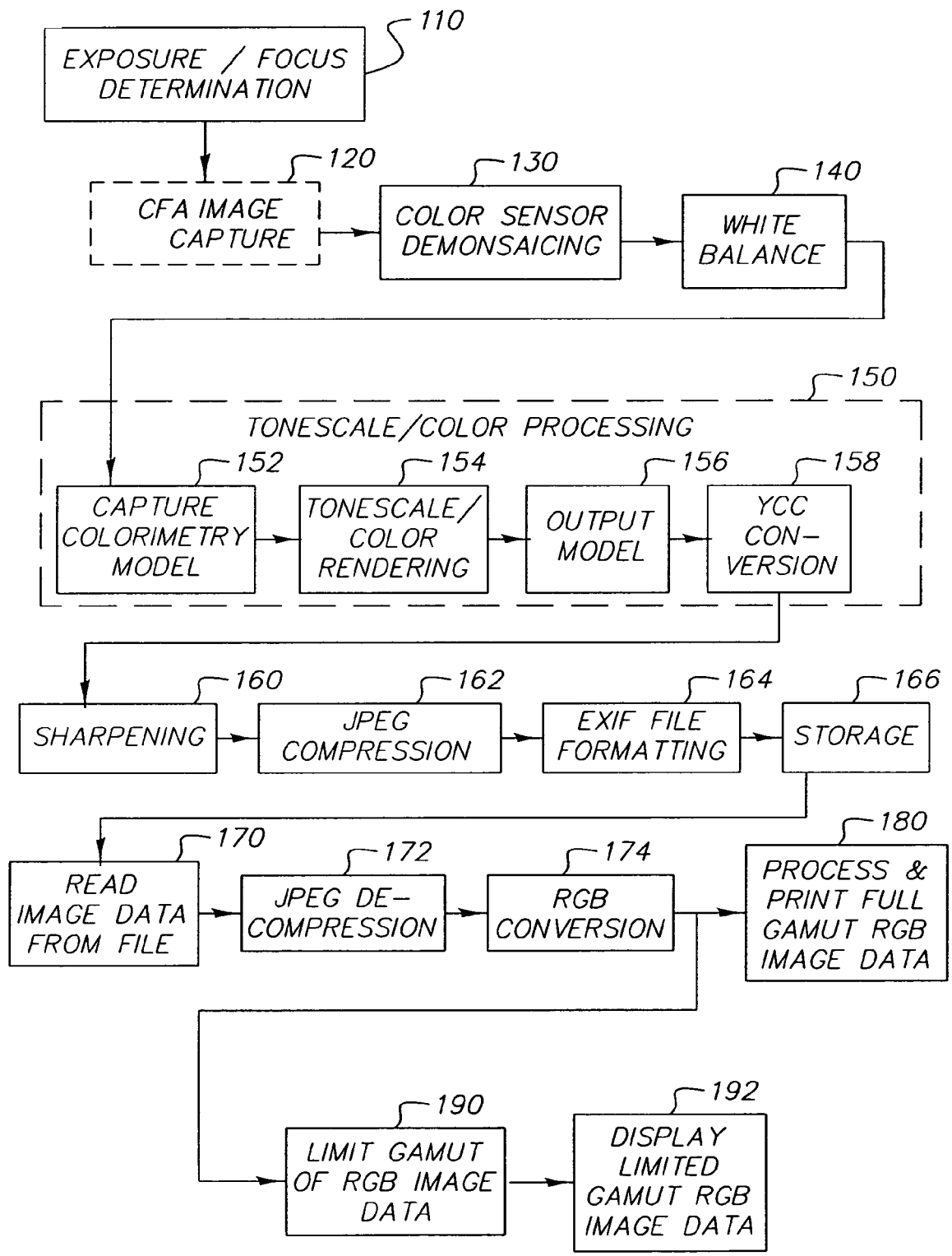
FIG. 3 illustrates in block form an image processing chain utilized in the digital camera of FIG. 2.

FIG. 3 illustrates in block form an image processing chain utilized in the digital camera of FIG. 2. An exposure and focus determination block 110 provides the exposure time, and the lens f/number, and focus distance settings. In block 120, the still image is then captured using these settings. In block 130, CFA data from the sensor is interpolated, or "demosaiced" to reconstruct the "missing" color pixel values. In block 140, the white balance processing corrects for the scene illuminant. In block 150, the tone scale/color processing is used to compensate for the camera spectral sensitivities and "render" the image data. In block 160, the rendered image data is then sharpened. In block 162, the sharpened color image data is JPEG compressed in order to reduce the size of the image file to be stored. In block 164, the JPEG compressed data is formatted into an Exif image file, including the metadata and thumbnail image data described earlier. In block 166, the Exif image file is stored using the removable memory card 330.

In block 170, the extended color gamut luminance-chrominance digital image data is read from the stored image file. In block 172, the JPEG image data is decompressed. In block 174, the luminance-chrominance digital image data is converted to RGB image data using a 3×3 matrix (which is the inverse of the YCC conversion matrix used in block 158) to provide a full gamut output RGB digital image that can include both positive and negative RGB values. This full gamut output RGB digital image can be further processed and printed in block 180, for example using printer 26 or color printer 54 in FIG. 1. In addition, the gamut of the RGB image data can be limited in block 190, for example by clipping all R,G, or B values less than 0 to be equal to 0, and clipping all R, G, or B values greater than 255 to be equal to 255. This provides a limited gamut output RGB digital image from the extended color gamut luminance-chrominance digital image. In block 192, the limited gamut images are displayed, for example using display monitor 14 in FIG. 1. In this case, the limited gamut output RGB digital image can match the gamut of the display monitor. The limited gamut output RGB digital image is determined by applying an inverse luminance-chrominance matrix transformation to the extended color gamut luminance-chrominance digital image to compute nonlinear extended range output RGB image values in block 174, and then clipping the nonlinear extended range output RGB image values to the gamut of an output image display device in block 190.

The white balance provided in block 140 adjusts the RGB signal levels provided by the image sensor in to correct for the color temperature of the light source used to illuminate the scene. The amounts of red and blue light in daylight sources are approximately equal. However, many artificial light sources, such as tungsten light bulbs, provide a much higher proportion of red light than blue light. Images taken using these illuminants must have the blue signal amplified, to prevent white objects from appearing unnaturally yellow in the reproduced image. To provide white balance, the red, green, and blue signal levels are corrected using appropriate white balance correction values. This may be done using an automatic algorithm, as described in commonly assigned U.S. Pat. No. 5,659,357 to Miyano, the disclosure of which is herein incorporated by reference. The white balance correction values can alternatively be determined manually as the user views an image on the color LCD image display 332, as described in commonly assigned U.S. patent application Ser. No. 09/810,788 filed Mar. 16, 2002 by Shimizu entitled "Electronic Camera", the disclosure of which is herein incorporated by reference. The white balance correction values can alternatively be determined using a white card, and can be stored for later use, as described in commonly assigned U.S. patent application Ser. No. 09/759,475 filed Jan. 12, 2001 by McGarvey entitled "A Venue Customizable White Balance Digital Camera System", the disclosure of which is herein incorporated by reference.

In block 150, the white balanced camera RGB image signals are transformed into an extended color gamut luminance-chrominance YCC digital image. This process can be broken into four steps: a capture colorimetry model step 152; a tone scale/color rendering step 154; an output device model step 156; and a YCC conversion step 158.

Figure 4A:
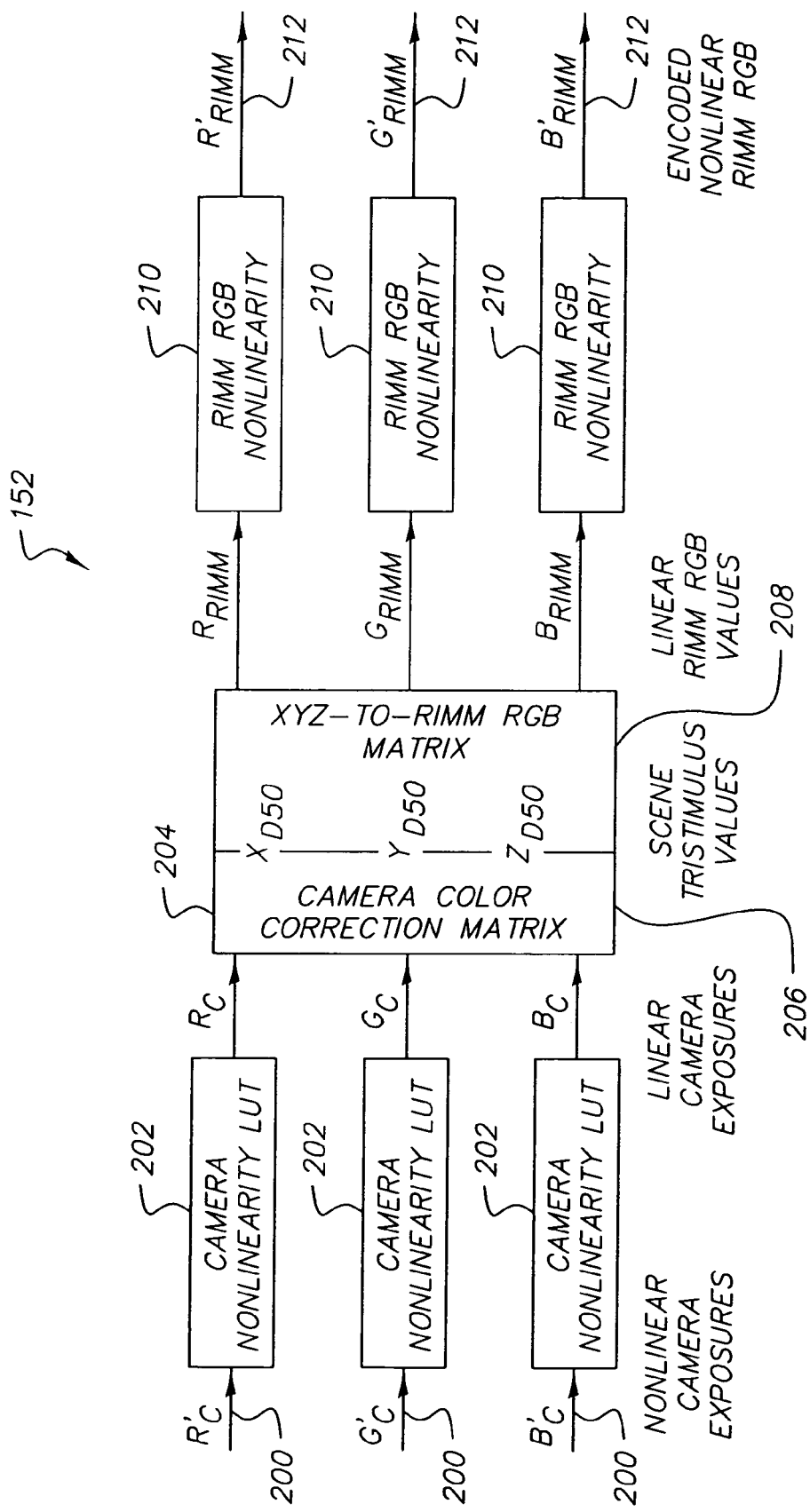
FIG. 4A depicts in block form a capture model.

FIG. 4A depicts in block form a capture colorimetry model 152. The capture colorimetry model 152 converts the nonlinear camera RGB exposures 200 (which are the code values provided by ASP and A/D converter 316 in FIG. 2 after sensor de-mosaicing 130 and white balancing 140) which provide an estimate of the colorimetry of the original scene, to the R', G' and B' RIMM RGB (Reference Input Medium Metric RGB) values 212. The RIMM RGB color encoding, described in the paper "Optimized Extended Gamut Color Encodings for Scene-Referred and Output-Referred Image States," by K.E. Spaulding et al., in the Journal of Imaging Science and Technology, Vol. 45, pp. 418-426 (2001), represents the scene colors in terms of a set of imaginary wide-gamut additive primaries, which will be described later in reference to FIG. 5. As will be described later in reference to FIG. 4B, the use of this color encoding has the advantage that desirable tone scale/color reproduction characteristics can be accomplished in the tone scale/color rendering step using simple one-dimensional look-up tables (LUTs). Thus, the capture colorimetry model 152 determines intermediate scene RGB image values (RIMM RGB values) for the captured digital image by representing the scene colors in terms of a first set of RGB primaries, which are the RIMM/ROMM RGB primaries. It will be obvious to one skilled in the art that other sets of suitable large gamut primaries could alternatively be used.

In FIG. 4A, the first set of 1-D LUTs 202 is used to undo any nonlinearity that may have been applied to the sensor signals during the capture process. The output of these LUTs 202 provides linear camera exposure values. Next, a camera color-correction matrix 206 is used to relate the camera exposure values to the scene tristimulus values. In theory, it can be shown that a 3×3 matrix operation can perfectly model this relationship, subject to the constraint that the sensor spectral sensitivities are linear combinations of the human visual system color matching functions. In practice, this condition is never exactly met, but a 3×3 color-correction matrix can still be used as an approximate solution. Although an optimal color-correction matrix can be computed from the spectral sensitivities of the sensors, it is usually more convenient and more accurate to determine the matrix by applying a least-squares fitting technique to measured data for a set of color patches.

In block 208, the following matrix can be used to compute the linear RIMM RGB values from the scene tristimulus values:

$$\begin{bmatrix} R_{RIMM} \\ G_{RIMM} \\ B_{RIMM} \end{bmatrix} = \begin{bmatrix} 1.3460 & -0.2556 & -0.0511 \\ -0.5446 & 1.5082 & 0.0205 \\ 0.0000 & 0.0000 & 1.2123 \end{bmatrix} \begin{bmatrix} X_{D50} \\ Y_{D50} \\ Z_{D50} \end{bmatrix}. \quad \text{(Eqn. 1)}$$

(Note that this assumes that the camera color-correction matrix produces scene tristimulus values with respect to a D50 white point. If some other white point was assumed, a chromatic adaptation step would be required before applying this matrix.) Generally, the two matrix operations (block 206 and block 208) can be combined into a single matrix multiplication 204 for implementation purposes.

In LUT 210 the linear RIMM RGB values are converted to an integer representation by applying the RIMMRGB nonlinearity:

$$C'_{RIMM} = \begin{cases} 0; & C_{RIMM} < 0.0 \\ \left(\dfrac{I_{max}}{V_{clip}}\right) 4.5 C_{RIMM}; & 0.0 \leq C_{RIMM} < 0.018 \\ \left(\dfrac{I_{max}}{V_{clip}}\right)(1.099 C_{RIMM}^{0.45} - 0.099); & 0.018 \leq C_{RIMM} < E_{clip} \\ I_{max} & C_{RIMM} \geq E_{clip} \end{cases} \quad \text{(Eqn. 2)}$$

where C is either R, G, or B, $I_{max}$ is the maximum integer value used for the nonlinear encoding, $E_{clip}=2.0$ is the exposure level that is mapped to $I_{max}$, and $$V_{clip} = 1.099 E_{clip}^{0.45} - 0.099 = 1.402. \quad \text{(Eqn. 3)}$$

Generally, the camera model shown in FIG. 4A will have different parameter values for camera nonlinearity LUTs 202 and camera color-correction matrix 206 for each different type of digital camera, reflecting the differences in the sensor's spectral sensitivities, as well as any nonlinear function used to encode the sensor signal values. In some cases, it is desirable to use a capture colorimetry model that is determined specifically each individual camera, in order to provide improved color reproduction. This can be accomplished as described in commonly assigned U.S. Pat. No. 5,668,596 to Vogel, the disclosure of which is herein incorporated by reference.

Instead of using the camera model shown in FIG. 4A, an alternative camera model can be used, for example by using complex transformations such as 3-D LUTs. Instead of using RIMM RGB to represent the scene colorimetry, the scene colorimetry could be represented by conventional CIE colorimetry, or some other extended gamut encoding.

Such an alternative camera model could also be a function of the spectral characteristics of the scene illuminant. Since digital cameras are used to capture images under a variety of different illuminants, a different capture colorimetry model should ideally be used in each case. While the white balance correction described earlier in reference to block 140 can be used to bring neutral scene objects back to the corrected color values, it can not fully correct for other scene colors. It is possible for digital cameras to implement more complex changes in the camera model as a function of the scene illuminant. In such cases, the appropriate camera model for the specific scene illumination conditions may be selected based on the results of the white balance determination described earlier, as described in commonly assigned U. S. Pat. No. 5,805,213 to Spaulding, the disclosure of which is herein incorporated by reference.

The tone scale/color rendering step 154 in FIG. 3 is used to specify the desired relationship between the original scene colors and the rendered image colors. The tone scale/color rendering step 154 compensates for differences between the scene and rendered image viewing conditions. For example, rendered images (such as hardcopy prints or images displayed on a computer monitor) made from digital camera images are generally viewed at luminance levels much lower than those of typical outdoor scenes. Consequently, an increase in the overall contrast of the rendered image usually is required in order to compensate for perceived losses in reproduced luminance and chrominance contrast. Additional contrast increases in the darker regions of the image also are needed to compensate for viewing flare associated with rendered-image viewing conditions. The tone scale/color rendering step 154 must also account for the fact that the dynamic range of a rendered image usually is substantially less than that of an original scene. It is therefore typically necessary to discard or compress some of the highlight and shadow information of the scene to fit within the dynamic range of the rendered image.

Figure 4B:
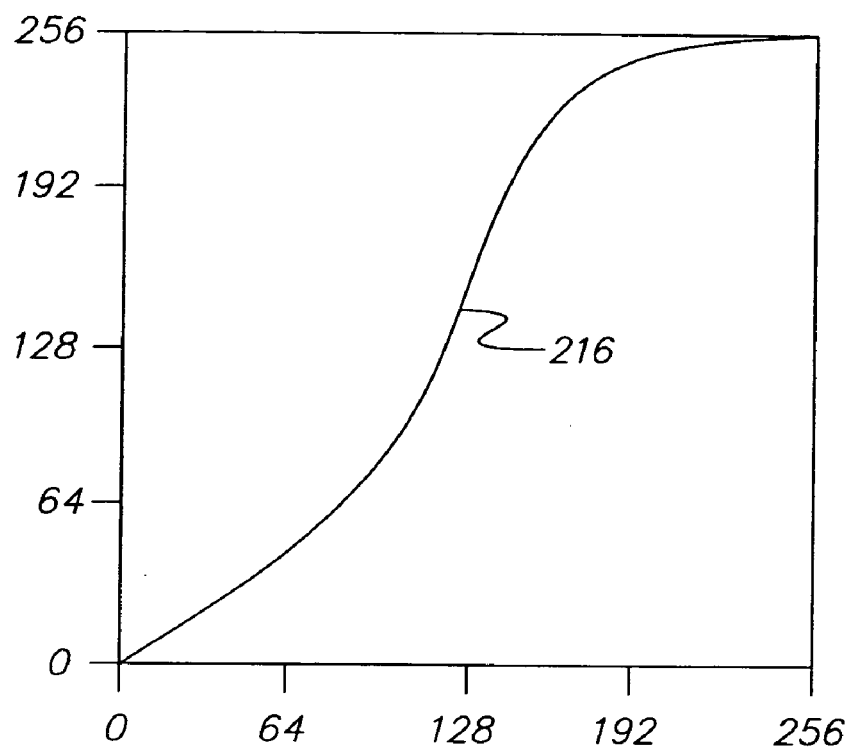
FIG. 4B depicts an example of a tone scale/color rendering lookup table.
Figure 4D:
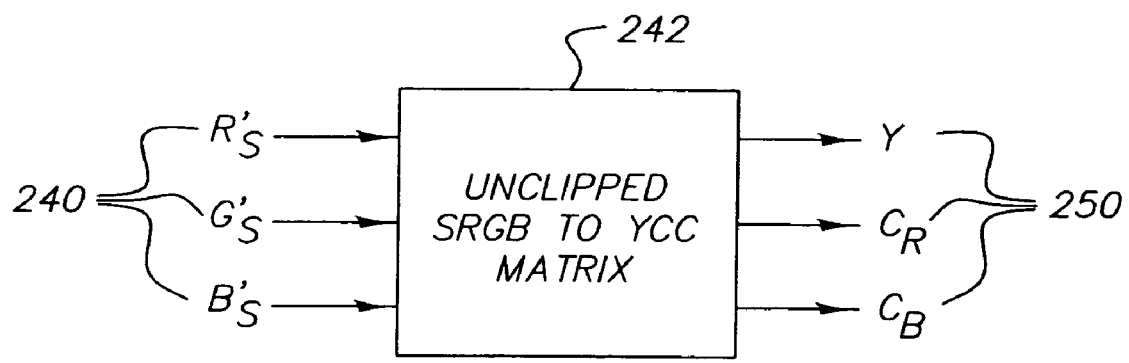
FIG. 4D depicts in block form a YCC conversion step.
Figure 4C:
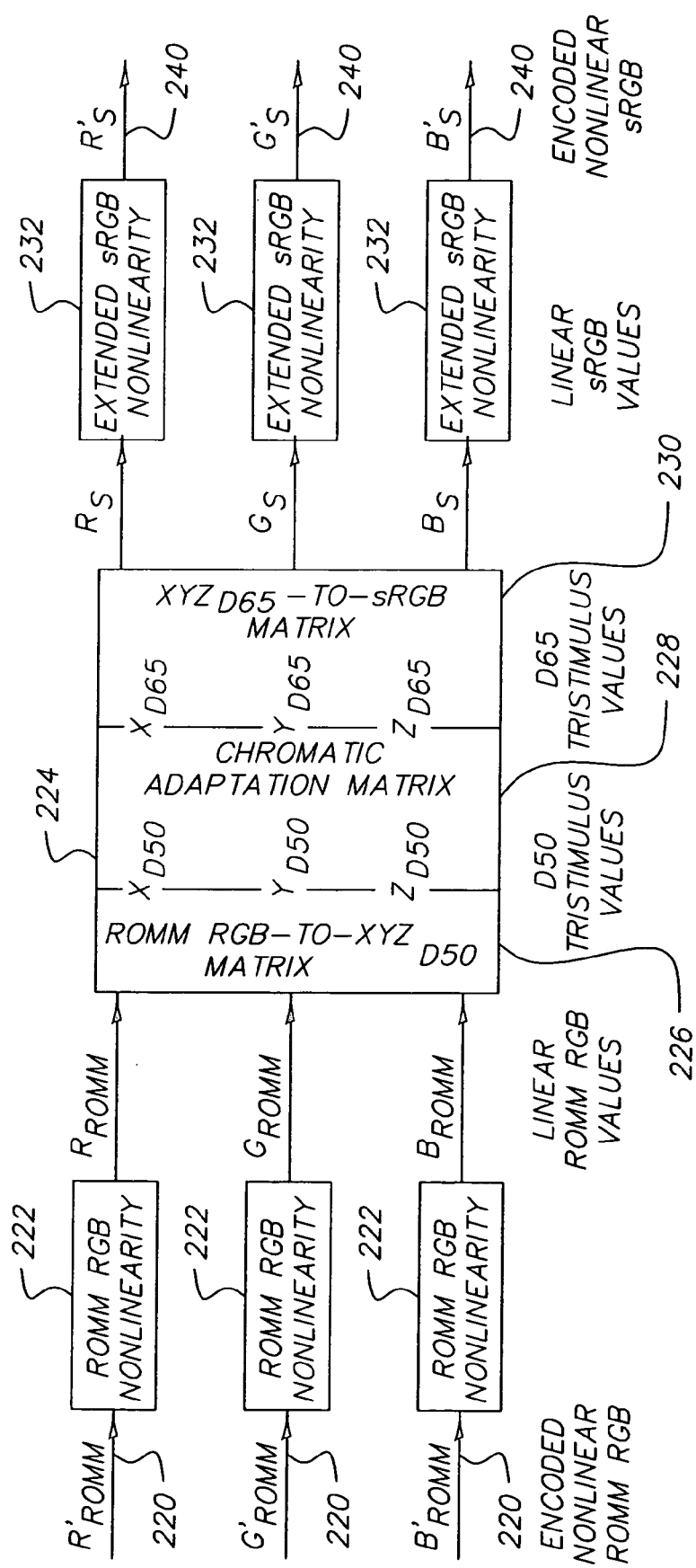
FIG. 4C depicts in block form an output model.

In a preferred embodiment, the tone scale/color rendering step 154 is a channel-independent tone scale function which is provided by lookup table 216, shown in FIG. 4B, which converts from the encoded RIMM RGB values 212 (FIG. 4A) to ROMM RGB (Reference Output Medium Metric RGB) color encoding values 220 (FIG. 4C). The ROMM RGB color encoding uses the same set of wide gamut primaries as RIMM RGB. Thus, step 154 determines intermediate rendered RGB image values by applying a rendering transform to the ROMM RGB intermediate scene RGB values. The rendered ROMM RGB image values are a representation of the colors of a rendered image in terms of the same set of RGB primaries, which are the RIMM/ROMM RGB primaries.

The advantages of applying the rendering step 154 to RGB signals encoded using a set of wide gamut primaries are described in commonly assigned U.S. Pat. No. 6,278,800 to Madden et. al., the disclosure of which is incorporated herein by reference.

In an alternative embodiment, a 3-D LUT can be used instead of the 1-D LUT 216 curve shape shown in FIG. 4B, in order to independently control the color reproduction in different parts of color space.

The output model step 156 is used to determine the output code values necessary to produce the desired color on an output device, which uses the sRGB primaries. A preferred embodiment of an output model that can be used to convert a rendered image in the ROMM RGB color encoding to sRGB is shown in FIG. 4C. First, linear ROMM RGB values are computed in LUTs 222 by applying the inverse nonlinearity:

$$C_{ROMM} = \begin{cases} \dfrac{C'_{ROMM}}{16\,I_{max}}; & 0.0 \leq C'_{ROMM} < 16\,E_t I_{max} \\ \left(\dfrac{C'_{ROMM}}{I_{max}}\right)^{1.8}; & 16\,E_t I_{max} \leq C'_{ROMM} \leq I_{max} \end{cases} \quad \text{(Eqn. 4)}$$

where $C_{ROMM}$ and $C'_{ROMM}$ are the nonlinear and linear ROMM RGB values, respectively, and C is either R, G or B, and $I_{max}=255$ for 8-bit ROMM RGB.

Next the linear ROMM RGB values can be converted to D50 $XYZ_{PCS}$ tristimulus values, by applying the following matrix 226:

$$\begin{bmatrix} X_{PCS} \\ Y_{PCS} \\ Z_{PCS} \end{bmatrix} = \begin{bmatrix} 0.7977 & 0.1352 & 0.0313 \\ 0.2880 & 0.7119 & 0.0001 \\ 0.0000 & 0.0000 & 0.8249 \end{bmatrix} \begin{bmatrix} R_{ROMM} \\ G_{ROMM} \\ B_{ROMM} \end{bmatrix}. \quad \text{(Eqn. 5)}$$

Since sRGB is defined using a D65 white point, a D50-to-D65 chromatic adaptation step must be applied before computing the sRGB color values. This can be accomplished using a simple von Kries transformation matrix 228 as follows:

$$\begin{bmatrix} X_{D65} \\ Y_{D65} \\ Z_{D65} \end{bmatrix} = \begin{bmatrix} 0.9845 & -0.0547 & 0.0678 \\ -0.0060 & 1.0048 & 0.0012 \\ 0.0000 & 0.0000 & 1.3200 \end{bmatrix} \begin{bmatrix} X_{D50} \\ Y_{D50} \\ Z_{D50} \end{bmatrix}. \quad \text{(Eqn. 6)}$$

(The Hunt-Pointer-Estevez cone primaries were used to derive this chromatic adaptation transform. Alternatively, other cone primaries or chromatic adaptation transforms could be used.)

The conversion from $XYZ_{D65}$ tristimulus values to the linear RGB values associated with the sRGB primaries is given by the following inverse phosphor matrix 230:

$$\begin{bmatrix} R_S \\ G_S \\ B_S \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \begin{bmatrix} X_{D65} \\ Y_{D65} \\ Z_{D65} \end{bmatrix}. \quad \text{(Eqn. 7)}$$

Finally, the desired encoded nonlinear sRGB code values 240 can be computed by applying the appropriate unclipped sRGB nonlinearity and integerizing using LUTs 232:

$$C'_S = \begin{cases} 255(-1.055(-C_S)^{1/2.4} + 0.055); & C_S < -0.0031308 \\ 255(12.92\,C_S); & |C_S| \leq 0.0031308 \\ 255(1.055\,C_S^{1/2.4} - 0.055); & C_S > 0.0031308 \end{cases} \quad \text{(Eqn. 8)}$$

where C is either R, G, or B.

For implementation, the three sequential matrix operations 226-230 given in Equations 5-7 can be combined by cascading the matrices together to form the following single matrix 224:

$$\begin{bmatrix} R_S \\ G_S \\ B_S \end{bmatrix} = \begin{bmatrix} 2.0564 & -0.7932 & -0.2632 \\ -0.2118 & 1.2490 & -0.0372 \\ -0.0152 & -0.1405 & 1.1556 \end{bmatrix} \begin{bmatrix} R_{ROMM} \\ G_{ROMM} \\ B_{ROMM} \end{bmatrix}. \quad \text{(Eqn. 9)}$$

Thus, the transformation from ROMM RGB to sRGB can be implemented with a simple LUT-matrix-LUT chain. In order to maintain the extended color gamut, the sRGB image data must remain "unclipped", so that negative code values and code values greater than 255 are maintained.

In block 158, the "unclipped" sRGB code values are converted to YCC code values 250, as shown in FIG. 4D. The matrix 242 is used to perform the conversion:

$$\begin{bmatrix} Y \\ Cr \\ Cb \end{bmatrix} = \begin{bmatrix} 0.2990 & 0.5870 & 0.1140 \\ 0.5000 & -0.4187 & -0.0813 \\ -0.1687 & -0.3312 & 0.5000 \end{bmatrix} \begin{bmatrix} R_S \\ G_S \\ B_S \end{bmatrix}. \quad \text{(Eqn. 10)}$$

The YCC values 250 can then be processed in steps 160-180 to provide an Exif image file having an extended color gamut.

Figure 4E:
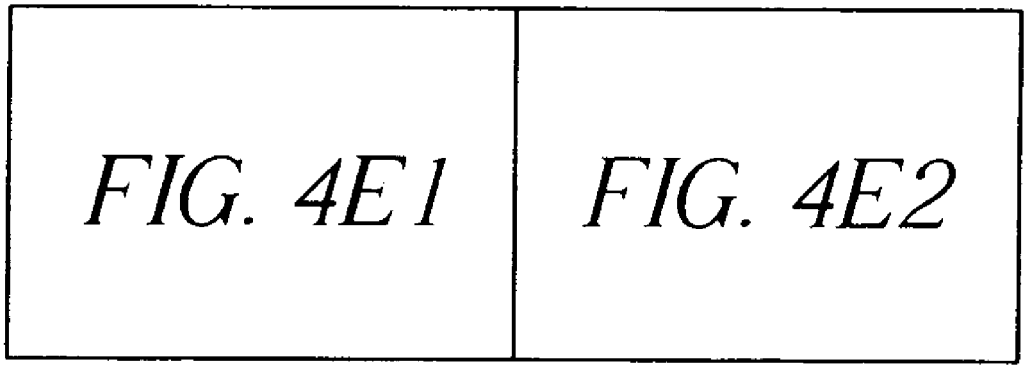
FIG. 4E depicts in block form a tone scale/color processing chain.
Figure 4E:
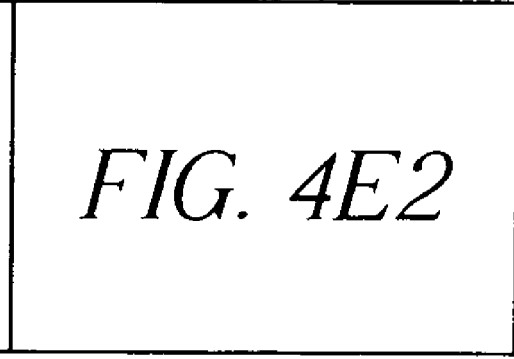

To reduce computations in performing the tone scale/color processing block 150, it is desirable to cascade steps 152-158 together to maximize computation efficiency. Since sequential matrix operations can easily be combined to form a single matrix, and likewise, sequential LUT operations can be combined to form a single LUT, this entire tone scale/color processing chain can be implemented using a LUT-matrix-LUT-matrix-LUT-matrix operation, as shown in FIG. 4E. The RIMM RGB nonlinearity LUT 210, tone scale rendering LUT 216, and the ROMM RGB nonlinearity LUT 222 are cascaded into a single LUT 218.

Figure 5:
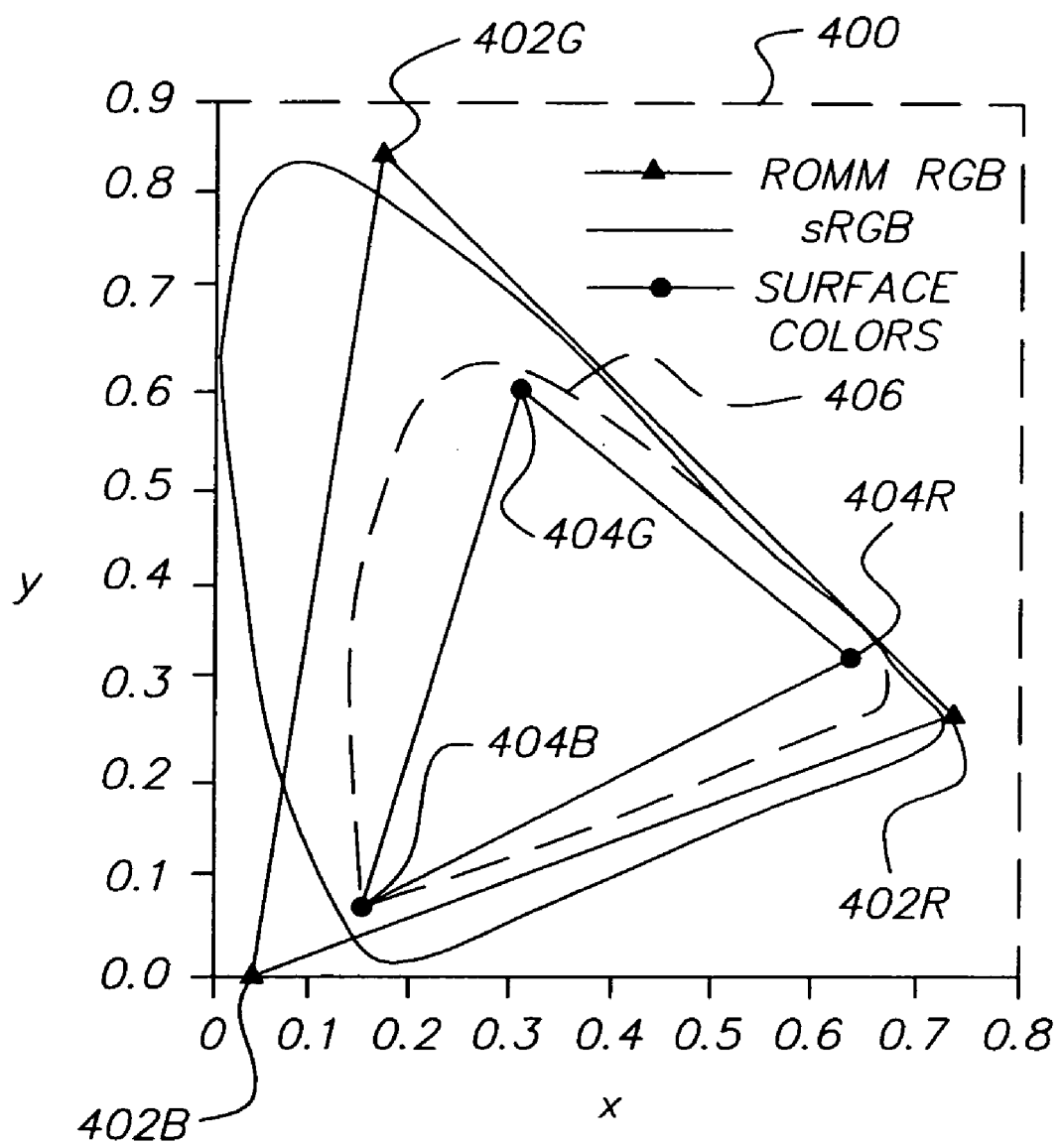
FIG. 5 depicts two sets of color primaries.

FIG. 5 is a chromaticity diagram 400, which depicts both the RIMM/ROMM RGB primaries 402 and the sRGB primaries 404. Also shown is the gamut of real world surface colors 406. As was described earlier in reference to FIGS. 4A-4E, the RIMM/ROMM RGB primaries 402 provide a first set of RGB primaries which are used in representing the captured digital image color values, and in rendering the captured digital image color values. The RIMM/ROMM RGB primaries 402 have a color gamut large enough to encompass the gamut of real world surface colors 406, and as such can be used to represent most real world colors of interest. They also have the desirable feature that they produce minimal hue shifts under the application of nonlinear tone scales, such as that shown in FIG. 4B. The sRGB primaries 404 provide a second set of RGB primaries associated with an sRGB output image display device, such as a color CRT display. It can be seen that many colors in the gamut of real world surface colors 406 are outside of the color gamut associated with the sRGB primaries 404.

A computer program product, such as a readable storage medium, can store the programs in accordance with the present invention for operating the methods set forth above. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the scope of the invention.

PARTS LIST 10 home computer
12 CPU motherboard
14 display monitor
16 keyboard
18 mouse
20 hard drive
22 modem
24 card reader
26 printer
30 Internet Service Provider
32 modems
34 computers/routers
36 channel
40 photo service provider
42 Internet server
44 electronic database
50 fulfillment system
52 production controller
54 color printer
66 photo product
110 block
120 block
130 block
140 block
150 block
152 block
154 block
156 block
158 block
160 block
162 block
164 block
166 block
170 block
172 block
174 block
180 block
190 block
192 block
200 nonlinear camera RGB exposures
202 LUT
204 matrix
206 matrix
208 matrix
210 RIMM RGB nonlinearity
212 encoded RIMM RGB values
216 LUT
218 LUT
220 encoded ROMM RGB values
222 LUT
224 matrix
226 matrix
228 matrix
230 matrix
232 LUT
240 encoded nonlinear sRGB code values
242 matrix
250 YCC values
300 digital camera
302 flash 303 user controls
304 control processor and timing generator circuit
306 clock drivers
308 auto-exposure detectors
310 focus motors
312 zoom lens
314 image sensor
316 ASP & A/D converter circuit
318 DRAM buffer memory
320 image processor
322 host interface
324 memory card interface
326 RAM memory
328 firmware memory
330 removable memory card
332 color LCD image display
342 interface cable
400 chromaticity diagram
402 RIMM/ROMM primaries
402B RIMM/ROMM primaries
402G RIMM/ROMM primaries
402R RIMM/ROMM primaries
404 sRGB primaries
404B sRGB primaries
404G sRGB primaries
404R sRGB primaries
406 surface colors
602 block
604 block
606 block
608 block
610 block
612 block

What is claimed is:

1. A method for producing an extended color gamut luminance-chrominance digital image from sensor color exposure values for a captured digital image comprising:
   a) using a color image sensor to provide sensor color exposure values for an original scene;
   b) determining intermediate extended gamut scene RGB image values for the captured digital image from the sensor color exposure values by representing the scene colors in terms of a first set of extended gamut RGB primaries;
   c) determining intermediate extended gamut rendered RGB image values by applying a rendering transformation to the intermediate extended gamut scene RGB image values, wherein the extended gamut rendered RGB image values are a representation of the colors of a rendered image in terms of the first set of extended gamut RGB primaries;
   d) determining extended range output RGB image values from the intermediate extended gamut rendered RGB image values by transforming from the first set of extended gamut RGB primaries to a second set of RGB primaries associated with an output image display device to produce extended range output RGB image values, wherein the extended range output RGB image values include values outside the range that can be displayed on the output image display device; and
   e) producing an extended color gamut luminance-chrominance digital image by transforming the extended range output RGB image values to a luminance-chrominance representation.

2. The method of claim 1 wherein the captured digital image is captured by a digital camera.

3. The method of claim 1 wherein the captured digital image is captured by scanning a film with a film scanner.

4. The method of claim 1 wherein the captured digital image is captured by scanning a print with a print scanner.

5. The method of claim 1 where the first set of extended gamut RGB primaries are selected to have an associated chromaticity gamut sufficiently large to encompass the gamut of real world surface colors.

6. The method of claim 1 wherein the first set of extended gamut RGB primaries are selected so as to substantially minimize hue shifts that are induced when a rendering transformation comprised of a channel-independent tone scale function is applied to the intermediate extended gamut scene RCJB image values.

7. The method of claim 1 wherein the extended range output RGB image values retain negative output RGB image values.

8. The method of claim 1 wherein the extended range output RGB image values retain output RGB image values larger than those associated with the output image display device whitepoint.

9. The method of claim 1 wherein step e) includes the steps:
   i) determining nonlinear extended range output RGB image values by applying a channel-independent nonlinear transformation to the extended range output RGB image values; and
   ii) applying a luminance-chrominance matrix transformation to the nonlinear extended range output RGB image values.

10. The method of claim 1 further including the step of including the extended color gamut luminance-chrorninance digital image in an image file.

11. The method of claim 10 further including the step of compressing the extended color gamut luminance-chrominance digital image to reduce the size of the image file.

12. The method of claim 10 further including the step of reading the extended color gamut luminance-chrominance digital image from the image file.

13. The method of claim 12 further including the step of determining a limited gamut output RGB digital image from the extended color gamut luminance-chrominance digital image.

14. The method of claim 13 wherein the limited gamut output RGB digital image is determined by applying an inverse luminance-chrominance matrix transformation to the extended color gamut luminance-chrominance digital image to compute nonlinear extended range output RGB image values, and then clipping the nonlinear extended range output RGB image values to the gamut of an output image display device.

15. The method of claim 14 where the nonlinear extended range output RGB image values are clipped to the gamut of the output image display device by clipping any negative nonlinear extended range output RGB image values and any nonlinear extended range output RGB image values larger than those associated with a whitepoint of the output image display device.

16. The method of claim 1 wherein the second set of RGB primaries are the sRGB primaries.

17. The method of claim 16 wherein the values outside the range that can be displayed on the output image display device correspond to extended sRGB values where at least one of the R, G or B values is a negative number.

18. The method of claim 16 further including the step of compressing the luminance and chrominance values.

19. The method of claim 18 wherein the compression is JPEG compression.

20. The method of claim 1 wherein step b) is provided by a matrix transformation.

21. The method of claim 1 wherein step d) is provided by a matrix transformation.

22. The method of claim 1 wherein steps b) and d) are provided by matrix transformations, and the rendering transformation in step c) is provided by a channel-independent tone scale function.

23. The method of claim 1 wherein a plurality of the steps are combined and provided by a three-dimensional look-up table.

24. A digital camera for providing an extended color gamut luminance-chrominance digital image from an image captured by the digital camera, comprising:
 a) a color image sensor for capturing the image of an original color scene and providing an original color signal;
 b) an image processor for processing the original color signal to produce an extended color gamut luminance-chrominance digital image, wherein the image processor converts the original color signal to intermediate extended gamut scene RGB color signals corresponding to a first set of extended gamut RGB primaries, applies a rendering transformation to the intermediate extended gamut scene RGB color signals to produce intermediate extended gamut rendered RGB color signals, transforms the intermediate extended gamut rendered RGB color signals to produce extended range output RGB color signals corresponding to a second set of RGB primaries associated with an output image display device, and uses the extended range output RGB color signals to provide the extended color gamut luminance-chrominance digital image, said digital image including at least one color value outside the range that can be displayed on the output image display device; and
 c) a digital storage device for storing the extended color gamut lurminance-chrominance digital image.

25. The digital camera of claim 24 wherein the second set of RGB primaries is the set of sRGB primaries.

26. The digital camera of claim 25 wherein the values outside the range that can be displayed on the output image display device correspond to sRGB values where at least one of the R, G or B values is a negative number.

27. The digital camera of claim 24 further including a means for compressing the luminance and chrominance values.

28. The digital camera ot claim 27 wherein the compression means uses JPEG compression.

* * * * *

UNITED STATES PATENT AND TRADEMARK OFFICE
CERTIFICATE OF CORRECTION

PATENT NO. : 7,289,663 B2 Page 1 of 1
APPLICATION NO. : 10/202313
DATED : October 30, 2007
INVENTOR(S) : Spaulding et al.

It is certified that error appears in the above-identified patent and that said Letters Patent is hereby corrected as shown below:

Column 14, Claim 6, line 14       "RCJB" should read --RGB--

Column 14, Claim 10, line 32      "luminance-chrorninance" should read
                                  --luminance-chrominance--

Column 16, Claim 24, line 13      "lurninance-chrominance" should read
                                  --luminance-chrominance--

Column 16, Claim 28, line 24      "ot" should read --of--

Signed and Sealed this

Thirteenth Day of May, 2008

JON W. DUDAS
*Director of the United States Patent and Trademark Office*